United States Patent
Wang et al.

(10) Patent No.: US 12,418,908 B2
(45) Date of Patent: Sep. 16, 2025

(54) USER EQUIPMENT-COORDINATION SET FULL-DUPLEX COMMUNICATION

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

(*) Notice: Subject to any disclaimer, the term of this patent is extended or adjusted under 35 U.S.C. 154(b) by 337 days.

(21) Appl. No.: 18/006,341

(22) PCT Filed: Jul. 1, 2021

(86) PCT No.: PCT/US2021/040093
§ 371 (c)(1),
(2) Date: Jan. 20, 2023

(87) PCT Pub. No.: WO2022/026118
PCT Pub. Date: Feb. 3, 2022

(65) Prior Publication Data
US 2023/0276424 A1    Aug. 31, 2023

Related U.S. Application Data

(60) Provisional application No. 63/058,162, filed on Jul. 29, 2020.

(51) Int. Cl.
H04L 5/14 (2006.01)
H04W 72/121 (2023.01)
H04W 72/541 (2023.01)

(52) U.S. Cl.
CPC ........... H04W 72/121 (2013.01); H04L 5/14 (2013.01); H04W 72/541 (2023.01)

(58) Field of Classification Search
CPC ...... H04L 5/14; H04W 72/121; H04W 72/541
See application file for complete search history.

(56) References Cited

U.S. PATENT DOCUMENTS

2017/0170946 A1  6/2017  Min et al.
2017/0237535 A1  8/2017  Park et al.
(Continued)

FOREIGN PATENT DOCUMENTS

CN  101026784 A  8/2007
WO  2020139811   7/2020
(Continued)

OTHER PUBLICATIONS

"Foreign Office Action", IN Application No. 202347006147, Mar. 18, 2024, 6 pages.
(Continued)

Primary Examiner — Gbemileke J Onamuti
(74) Attorney, Agent, or Firm — Colby Nipper PLLC

(57) ABSTRACT

Methods, devices, systems, and means for coordinating full-duplex communication are described in which a user equipment, UE, configured as a coordinating user equipment for a user equipment-coordination set, UECS, selects a first subset of UEs in the UECS to jointly receive downlink signals and selects a second subset of UEs in the UECS to jointly transmit uplink signals. The coordinating UE receives uplink data to transmit to the network entity and receives, from the first subset of UEs, demodulated and sampled downlink data that is received concurrently with joint-transmission of the uplink data. The coordinating UE combines the samples received from each UE in the first subset of UEs and jointly processes the combined samples to provide decoded data using the received uplink data to cancel crosstalk of uplink signals for the transmitted uplink data to downlink signals to the received downlink data.

22 Claims, 9 Drawing Sheets

(56) References Cited

U.S. PATENT DOCUMENTS

| | | |
|---|---|---|
| 2018/0227882 A1 | 8/2018 | Freda et al. |
| 2020/0092685 A1 | 3/2020 | Fehrenbach et al. |
| 2020/0127803 A1 | 4/2020 | Luo et al. |
| 2020/0145175 A1 | 5/2020 | Hassan Hussein et al. |
| 2020/0322962 A1 | 10/2020 | Wang et al. |

FOREIGN PATENT DOCUMENTS

| | | |
|---|---|---|
| WO | 2020142532 | 7/2020 |
| WO | 2020186097 | 9/2020 |
| WO | 2022026118 | 2/2022 |

OTHER PUBLICATIONS

"International Preliminary Report on Patentability", Application No. PCT/US2021/040093, Nov. 4, 2022, 8 pages.
"International Search Report and Written Opinion", Application No. PCT/US2021/040093, Oct. 22, 2021, 12 pages.
"Written Opinion", Application No. PCT/US2021/040093, Jul. 11, 2022, 8 pages.
"Coordinated multi-cell transmission for LTE-Advanced downlink", R1-082896, Aug. 2008, 4 pages.
"Foreign Office Action", CN Application No. 202180059460.X, Mar. 25, 2025, 18 pages.

USER EQUIPMENT-COORDINATION SET FULL-DUPLEX COMMUNICATION

RELATED APPLICATION(S)

This application is a national stage entry of International Application No. PCT/US2021/040093, filed Jul. 1, 2021, which claims the benefit of U.S. Provisional Application No. 63/058,162, filed Jul. 29, 2020, the disclosures of which are incorporated herein by reference in their entirety.

BACKGROUND

The evolution of wireless communication to fifth generation (5G) and sixth generation (6G) standards and technologies provides higher data rates and greater capacity with improved reliability and lower latency which enhances mobile broadband services. 5G and 6G technologies also provide new classes of services for vehicular networking, fixed wireless broadband, and the Internet of Things (IoT).

A unified air interface, which utilizes licensed, unlicensed, and shared license radio spectrum in multiple frequency bands is one aspect of enabling the capabilities of 5G and 6G systems. The unified air interface utilizes radio spectrum in bands below 1 GHz (sub-gigahertz), below 6 GHz (sub-6 GHz), and above 6 GHz. Radio spectrum above 6 GHz includes millimeter wave (mmWave) and terahertz (THz) frequency bands that provide wide channel bandwidths to support higher data rates for wireless broadband. Radio channels in these frequency bands are allocated for communication using time division duplexing or frequency division duplexing. However, there is an opportunity to improve spectrum utilization with full-duplex communication.

SUMMARY

This summary is provided to introduce simplified concepts of user equipment-coordination set full-duplex communication. The simplified concepts are further described below in the Detailed Description. This summary is not intended to identify essential features of the claimed subject matter nor is it intended for use in determining the scope of the claimed subject matter.

In aspects, methods, devices, systems, and means for coordinating full-duplex communication are described in which a user equipment (UE) configured as a coordinating user equipment for a user equipment-coordination set (UECS) in a wireless communications network selects a first subset of UEs in the UECS to jointly receive downlink signals and selects a second subset of UEs in the UECS to jointly transmit uplink signals. The coordinating UE transmits an indication that the UECS is capable of full-duplex communication to a network entity and receives, from the network entity, a resource grant for a target UE in the UECS. The coordinating UE receives uplink data to transmit to the network entity and receives, from the first subset of UEs, demodulated and sampled downlink data that is received concurrently with joint-transmission of the uplink data by the second subset of UEs. The coordinating UE combines the samples received from each UE in the first subset of UEs and jointly processes the combined samples to provide decoded data using the received uplink data to cancel crosstalk of uplink signals for the transmitted uplink data from downlink signals for the received downlink data.

In aspects, methods, devices, systems, and means for coordinating full-duplex communication are described in which a base station receives an indication from a user equipment-coordination set (UECS) that the UECS is capable of full-duplex communication, the indication including an indication of a full-duplex bandwidth for the full-duplex communication. Based on the indication that the UECS is capable of full-duplex bandwidth, the base station allocates downlink resources and uplink resources for full-duplex communication with a target user equipment, UE, in the UECS and transmits a first resource grant to the UECS, the first resource grant including an indication of the downlink resources and the uplink resources. The base station receives uplink signals for uplink data from the UECS using the uplink resources and, using downlink data that is concurrently transmitted to the UECS with the received uplink signals, processes the received uplink signals to provide decoded data using the downlink data to cancel interference from downlink signals for the transmitted downlink data to received uplink signals.

BRIEF DESCRIPTION OF THE DRAWINGS

The details of one or more aspects of user equipment-coordination set full-duplex communication are described below. The use of the same reference numbers in different instances in the description and the figures indicate similar elements.

DETAILED DESCRIPTION

Figure 1:
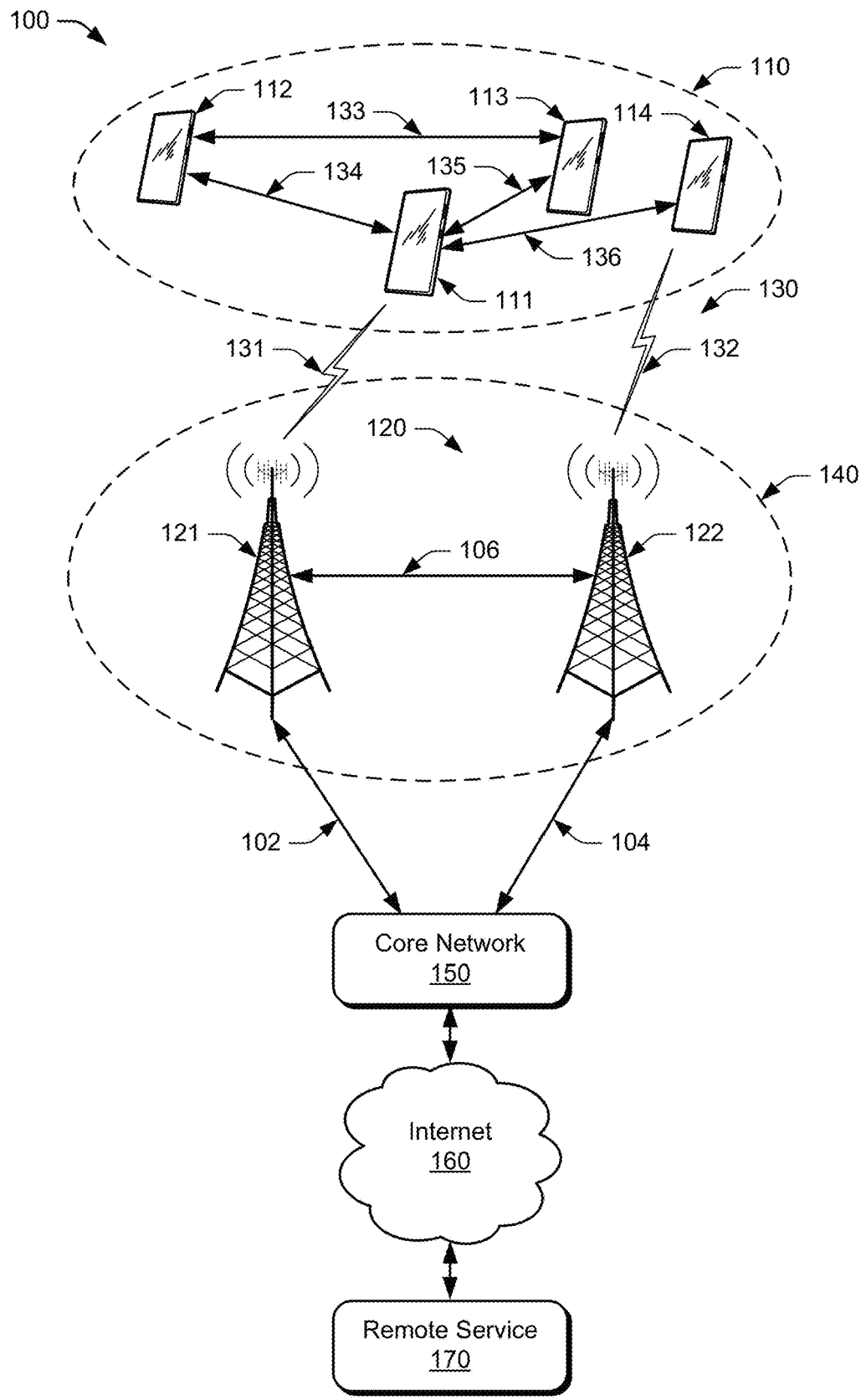
FIG. 1 illustrates an example operating environment in which aspects of user equipment-coordination set full-duplex communication can be implemented.

This document describes methods, devices, systems, and means for coordinating full-duplex communication in which a user equipment (UE) configured as a coordinating user equipment for a user equipment-coordination set (UECS) in a wireless communications network selects a first subset of UEs in the UECS to jointly receive downlink signals and selects a second subset of UEs in the UECS to jointly transmit uplink signals. The coordinating UE transmits an indication that the UECS is capable of full-duplex communication to a network entity and receives, from the network entity, a resource grant for a target UE in the UECS. The coordinating UE receives, from the first subset of UEs, demodulated and sampled downlink data that is jointly-received by the first subset of UEs concurrently with modulated and coded uplink data that is joint-transmitted by the second subset of UEs. The coordinating UE combines the samples received from each UE in the first subset of UEs and jointly processes the combined samples to provide decoded data using the received uplink data to cancel crosstalk of uplink signals for the transmitted uplink data from downlink signals for the received downlink data.

A UECS is formed by multiple UEs assigned as a group to function together, similarly to a distributed antenna, for the benefit of a particular UE (e.g., target UE). The UECS includes a coordinating UE that coordinates joint transmission of uplink signals and/or joint reception of downlink signals for the target UE or multiple target UEs in the UECS. By combining antennas and transmitters of multiple UEs in the UECS, the effective transmit power of the target UE is significantly increased, and the effective signal quality is greatly improved. Similarly, by combining antennas and receivers of multiple UEs in the UECS, the effective receive power of the target UE is significantly increased, and the effective signal quality is greatly improved.

Multiple UEs can each receive downlink data transmissions from the base station. Unlike conventional relay techniques, these UEs do not decode the downlink transmissions into data packets and then forward the data packets to a destination. Rather, the UEs demodulate and sample the downlink transmissions to produce I/Q samples. The UEs determine where to forward the I/Q samples of the downlink transmissions, such as to a coordinating UE for decoding. Note that a single UE may simultaneously have the roles of a coordinating UE and a target UE. In aspects, the target UE may be included in a subset of target UEs within the UECS. The coordinating UE receives the I/Q samples from the other UEs in the UECS and stores the I/Q samples in a buffer memory for decoding. Then, the coordinating UE synchronizes and decodes the stored I/Q samples into data packets for transmission to the target UE(s). Accordingly, the processing of the I/Q samples occurs at the coordinating UE. In this way, the UECS acts as a distributed antenna for the target UE.

When a target UE has uplink data to send to a base station, the target UE transmits the uplink data to the coordinating UE, which uses a local wireless network to distribute the uplink data to each UE in the UE-coordination set. Each UE in the UE-coordination set synchronizes with the base station for timing information and its data transmission resource assignment. Then, all the UEs in the UE-coordination set jointly transmit the uplink data to the base station. The base station receives the jointly-transmitted uplink data from the UEs and processes the combined signal to decode the uplink data from the target UE.

Full-duplex communication can improve spectral efficiency (utilization) for wireless communication. When uplink and downlink communications concurrently utilize the same frequency for full-duplex communication, the output power of a transmitter at a device (e.g., a UE or a base station) can make reception challenging for the device's receiver. For example, the transmitter output power of the device may be 100 dB or greater than the signal strength of the signal the device is attempting to receive. The isolation between the transmitter output and the receiver input of the device may be insufficient to handle the disparity between transmit and receive signal powers resulting in the transmitter's output interfering with the receiver's ability (e.g., saturating the input circuitry of the receiver) to receive and decode a desired receive signal.

In aspects, a UECS can exploit the geographic separation between UEs in the UECS for full-duplex communication on the same frequency or channel when communicating with a base station or an Active Coordination Set (ACS) of base stations. The geographic (physical) separation between UEs in a UECS provides greater isolation between receivers of downlink signals and transmitters of uplink signals than can be provided by a co-located transmitter and receiver in a single UE.

In one aspect, a coordinating UE determines a first subset of UEs in the UECS to participate in joint-reception and a second subset of UEs to participate in joint-transmission. Any UE in the UECS can be assigned to joint-reception or to joint-transmission, but no UE can be assigned to both. In a further aspect, the role of the coordinating UE can be shared by assigning a first UE the role of coordinating joint-reception (RX-coordinating UE) and assigning a second UE the role of coordinating joint-transmission (TX-coordinating UE). In this aspect, the TX-coordinating UE may share information related to the joint-transmissions with the RX-coordinating UE to assist the RX-coordinating UE in canceling crosstalk from the joint-transmission from jointly-received signals.

Example Environment

FIG. 1 illustrates an example environment 100, which includes multiple user equipment 110 (UE 110), illustrated as UE 111, UE 112, UE 113, and UE 114. When in communication range of a base station, each UE 110 can communicate with one or more base stations 120 (illustrated as base stations 121 and 122) through one or more wireless communication links 130 (wireless link 130), illustrated as wireless links 131 and 132. When individual UEs, such as the UE 111, the UE 112, the UE 113, and the UE 114 are individually out of communication range of a base station, those UEs can form a UECS and use joint-transmission and joint-reception to communicate with a base station. Each UE 110 in a UECS (illustrated as UE 111, UE 112, UE 113, and the UE 114) can communicate with a coordinating UE of the UECS and/or a target UE in the UECS through one or more local wireless network connections (e.g., WLAN, Bluetooth, NFC, a personal area network (PAN), WiFi-Direct, IEEE 802.15.4, ZigBee, Thread, millimeter wavelength communication (mmWave), or the like) such as local wireless network connections 133, 134, 135, and 136. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, vehicle-based communication system, an Internet-of-things (IoT) device (e.g., sensor node, controller/actuator node, combination thereof), and the like. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base station or the like, or any combination or future evolution thereof.

The base stations 120 communicate with a UECS or a user equipment 110 using the wireless links 131 and 132, respectively, which may be implemented as any suitable type of wireless link. The wireless links 131 and 132 include control and data communication, such as downlink of data and control information communicated from the base stations 120 to the user equipment 110, uplink of other data and control information communicated from the user equipment 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and future evolutions. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110. For example, an Active Coordination Set (ACS) of base stations can communicate with the UE 111 using CoMP communication. The ACS may be a component of, or used to implement, a user-centric no-cell (UCNC) network architecture.

The base stations 120 are collectively a Radio Access Network 140 (e.g., RAN, Evolved Universal Terrestrial Radio Access Network, E-UTRAN, 5G NR RAN, or NR RAN). The base stations 121 and 122 in the RAN 140 are connected to a core network 150. The base stations 121 and 122 connect, at 102 and 104 respectively, to the core network 150 through an NG2 interface for control-plane signaling and using an NG3 interface for user-plane data communications when connecting to a 5G core network, or using an S1 interface for control-plane signaling and user-plane data communications when connecting to an Evolved Packet Core (EPC) network. The base stations 121 and 122 can communicate using an Xn Application Protocol (XnAP) through an Xn interface or using an X2 Application Protocol (X2AP) through an X2 interface, at 106, to exchange user-plane and control-plane data. The user equipment 110 may connect, via the core network 150, to public networks, such as the Internet 160 to interact with a remote service 170.

Example Devices

Figure 2:
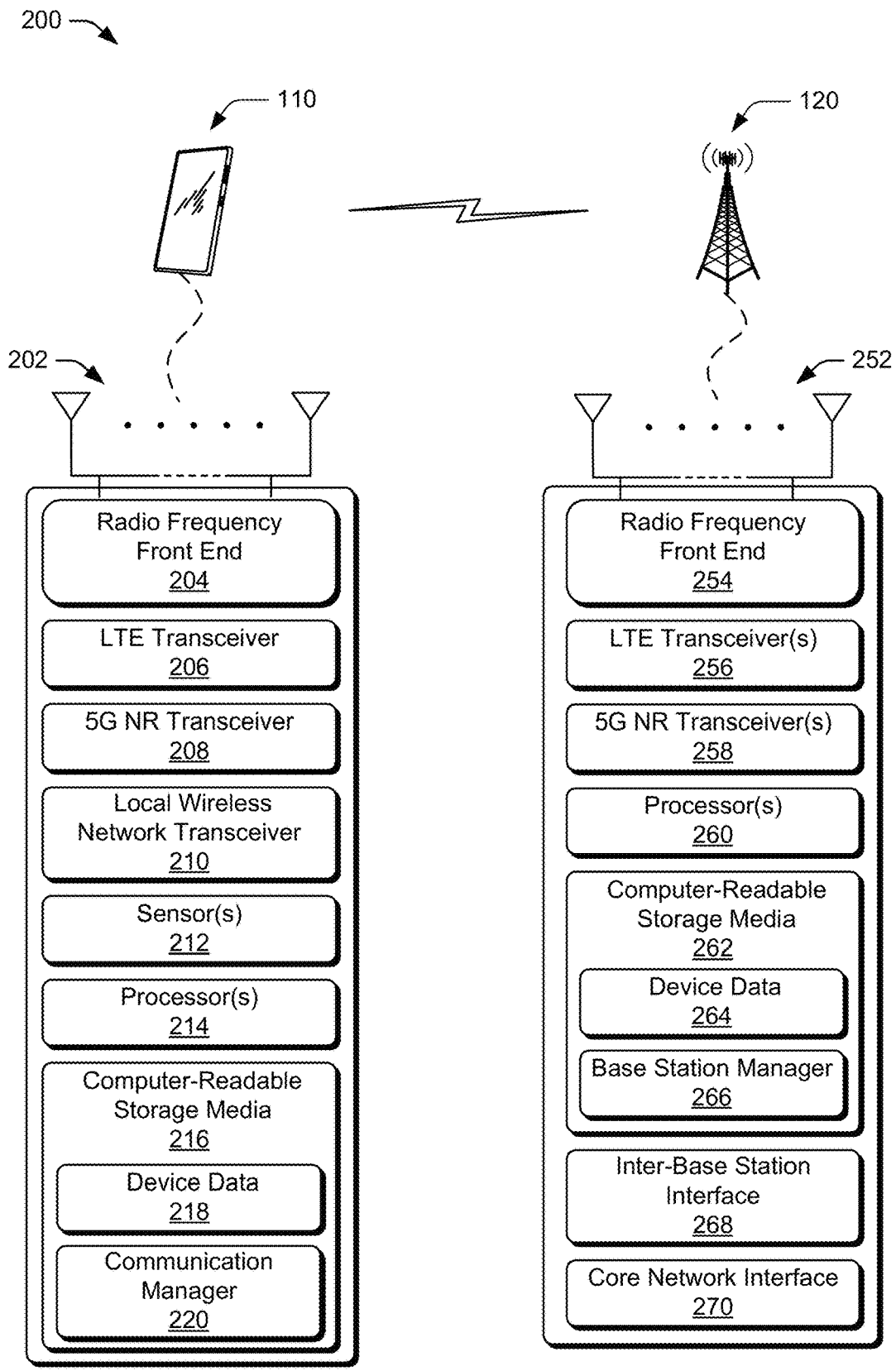
FIG. 2 illustrates an example device diagram of a user equipment and a serving cell base station.

FIG. 2 illustrates an example device diagram 200 of a user equipment and a base station. In aspects, the device diagram 200 describes devices that can implement various aspects of user equipment-coordination set full-duplex communication. Included in FIG. 2 are the multiple UE 110 and the base stations 120. The multiple UE 110 and the base stations 120 may include additional functions and interfaces that are omitted from FIG. 2 for the sake of illustration clarity. The UE 110 includes antennas 202, a radio frequency front end 204 (RF front end 204), and radio-frequency transceivers (e.g., an LTE transceiver 206 and a 5G NR transceiver 208) for communicating with base stations 120 in a 5G RAN and/or an E-UTRAN. The UE 110 includes one or more additional transceivers (e.g., local wireless network transceiver 210) for communicating over one or more wireless local wireless networks (e.g., WLAN, Bluetooth, NFC, a personal area network (PAN), WiFi-Direct, IEEE 802.15.4, ZigBee, Thread, mmWave, or the like) with at least the coordinating UE of the UECS. The RF front end 204 of the UE 110 can couple or connect the LTE transceiver 206, the 5G NR transceiver 208, and the local wireless network transceiver 210 to the antennas 202 to facilitate various types of wireless communication.

The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards. In addition, the RF front end 204 can be tuned to, and/or be tunable to, one or more frequency bands defined and implemented by the local wireless network transceiver 210 to support transmission and reception of communications with other UEs in the UECS over a local wireless network.

The UE 110 includes sensor(s) 212 can be implemented to detect various properties such as temperature, supplied power, power usage, battery state, or the like. As such, the sensors 212 may include any one or a combination of temperature sensors, thermistors, battery sensors, and power usage sensors.

The UE 110 also includes processor(s) 214 and computer-readable storage media 216 (CRM 216). The processor 214 may be a single core processor or a multiple core processor composed of a variety of materials, such as silicon, poly-silicon, high-K dielectric, copper, and so on. The computer-readable storage media described herein excludes propagating signals. CRM 216 may include any suitable memory or storage device such as random-access memory (RAM), static RAM (SRAM), dynamic RAM (DRAM), non-volatile RAM (NVRAM), read-only memory (ROM), or Flash memory useable to store device data 218 of the UE 110. The device data 218 includes user data, multimedia data, beamforming codebooks, applications, and/or an operating system of the UE 110, which are executable by processor(s) 214 to enable user-plane communication, control-plane signaling, and user interaction with the UE 110.

CRM 216 also includes a communication manager 220 (e.g., a communication manager application 220). Alternately or additionally, the communication manager 220 may be implemented in whole or part as hardware logic or circuitry integrated with or separate from other components of the UE 110. In at least some aspects, the communication manager 220 configures the RF front end 204, the LTE transceiver 206, the 5G NR transceiver 208, and/or the local wireless network transceiver 210 to implement the techniques described herein for user equipment-coordination set full-duplex communication.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency band defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with any UE 110 in a UECS.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base stations 120. The device data 264 includes network scheduling data, radio resource management data, beamforming codebooks, applications, and/or an operating system of the base stations 120, which are executable by processor(s) 260 to enable communication with the UE 110.

CRM 262 also includes a base station manager 266 (e.g., base station manager application 266). Alternately or additionally, the base station manager 266 may be implemented in whole or part as hardware logic or circuitry integrated with or separate from other components of the base stations 120. In at least some aspects, the base station manager 266 configures the LTE transceivers 256 and the 5G NR transceivers 258 for communication with the UE 110, as well as communication with a core network. The base stations 120 include an inter-base station interface 268, such as an Xn and/or X2 interface, which the base station manager 266 configures to exchange user-plane and control-plane data between another base station 120, to manage the communication of the base stations 120 with the UE 110. The base stations 120 include a core network interface 270 that the base station manager 266 configures to exchange user-plane and control-plane data with core network functions and entities.

Air Interface Resources

Figure 3:
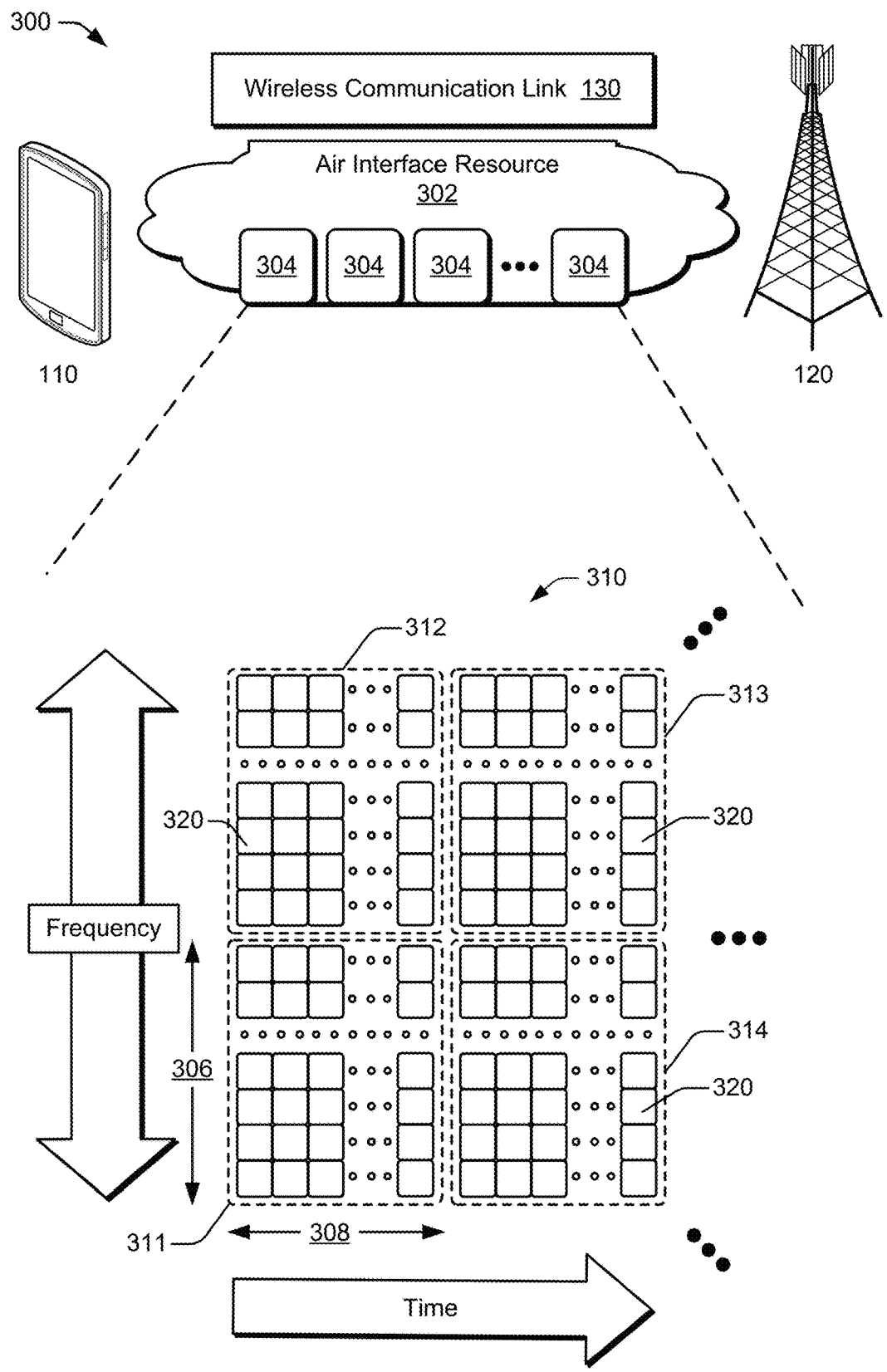
FIG. 3 illustrates an air interface resource that extends between a user equipment and a base station and with which various aspects of user equipment-coordination set full-duplex communication can be implemented.

FIG. 3 illustrates an air interface resource that extends between a user equipment and a base station and with which various aspects of user equipment-coordination set full-duplex communication can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., the resource units 304) of the air interface resource 302 for uplink and downlink communications. Each resource block 310 of network access resources may be allocated to support respective wireless communication links 130 of multiple user equipment 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or seven orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple user equipment 110 (one of which is shown) are communicating with the base stations 120 (one of which is shown) through access provided by portions of the air interface resource 302. The base station manager 266 (shown in FIG. 2) may determine a respective data-rate, type of information, or amount of information (e.g., data or control information) to be communicated (e.g., transmitted) by the user equipment 110. The base station manager 266 then allocates one or more resource blocks 310 to each user equipment 110 based on the determined data rate or amount of information.

Additionally, or in the alternative to block-level resource grants, the base station manager 266 may allocate resource units at an element-level. Thus, the base station manager 266 may allocate one or more resource elements 320 or individual subcarriers to different user equipment 110. By so doing, one resource block 310 can be allocated to facilitate network access for multiple user equipment 110. Accordingly, the base station manager 266 may allocate, at various granularities, one or up to all subcarriers or resource elements 320 of a resource block 310 to one user equipment 110 or divided across multiple user equipment 110, thereby enabling higher network utilization or increased spectrum efficiency.

The base station manager 266 can therefore allocate air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the base station manager 266 can transmit respective messages to the multiple user equipment 110 indicating the respective allocation of resource units 304 to each user equipment 110. Each message may enable a respective user equipment 110 to queue the information or configure the LTE transceiver 206 and/or 5G NR transceiver 208 to communicate via the allocated resource units 304 of the air interface resource 302.

User Equipment-Coordination Set Full-Duplex Communication

Figure 4:
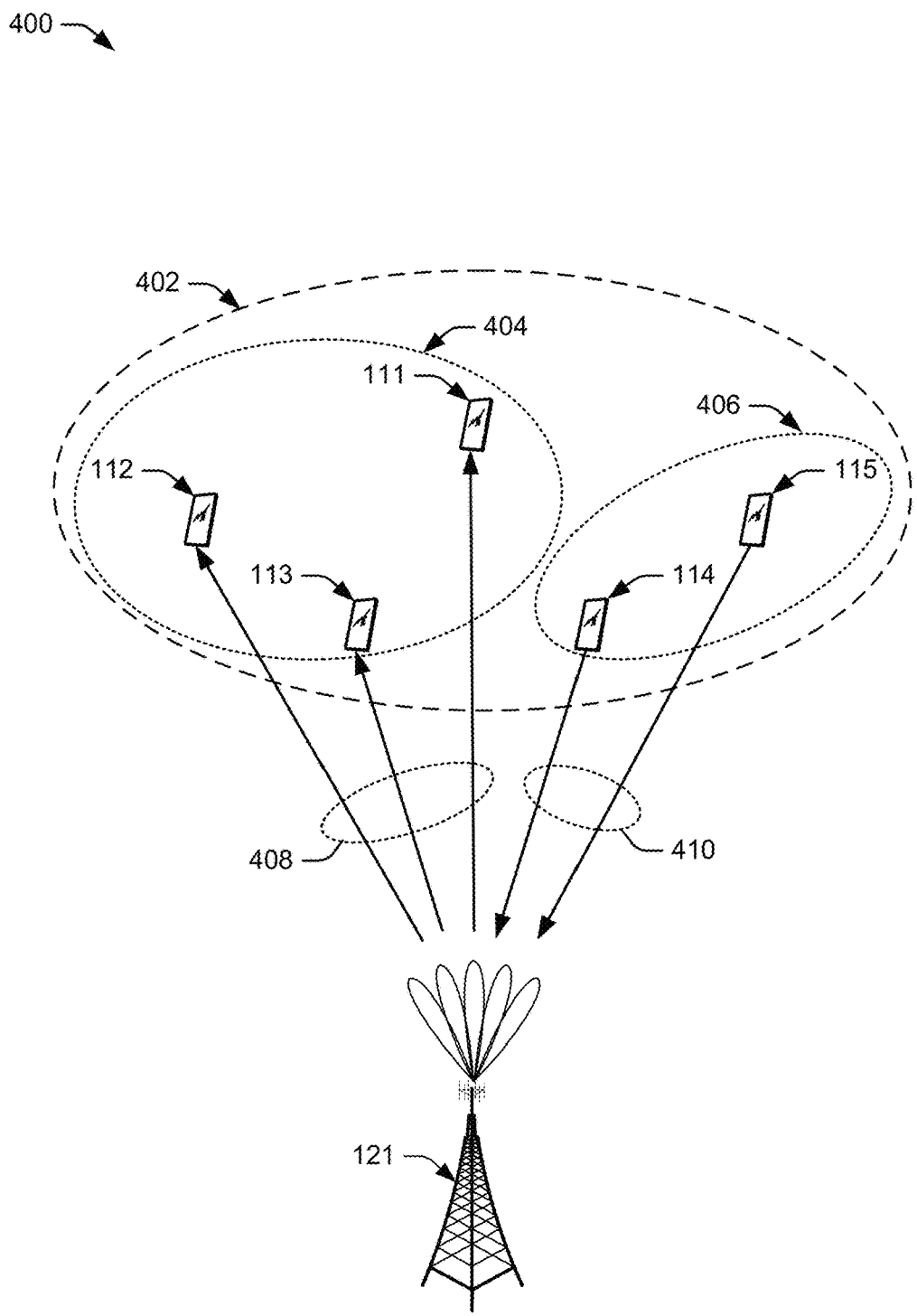
FIG. 4 illustrates an example environment in which various aspects of user equipment-coordination set full-duplex communication can be implemented.

FIG. 4 illustrates an example implementation 400 of user equipment-coordination set full-duplex communication. The illustrated example includes a base station 121 and a UECS 402 that includes UE 111, UE 112, UE 113, UE 114, and UE 115. Although, for the sake of illustration clarity, the UECS in FIG. 4 is illustrated as including five UEs, any number of UEs greater than one may be included in a UECS. In the UECS 402, the UE 111 is acting as the coordinating UE for the UECS 402. Although not illustrated for the sake of visual clarity, the UEs in the UECS communicate with each other using local wireless network connections as discussed above.

In aspects, the coordinating UE 111 selects a first subset 404 of UEs in the UECS 402 to participate in joint-reception of downlink (DL) signals (a DL-coordinating subset 404) and selects a second subset 406 of UEs to participate in joint-transmission of uplink (UL) signals (an UL-coordinating subset 406). The coordinating UE 111 can participate in joint-reception, joint-transmission, or neither joint-reception nor joint-transmission. For example, in the UECS 402, the coordinating UE has selected itself, the UE 112, and the UE 113 for the DL-coordinating subset 404 for joint-reception of downlink signals 408 from the base station 121 and the coordinating UE has selected the UE 114, and the UE 115 for UL-coordinating subset 406 for joint-transmission of uplink signals 410 to the base station 121. The coordinating UE 111 can select the subsets of UEs in any suitable manner such as including some or all of the UEs in the two subsets or selecting UEs for the respective subsets to provide the greatest physical isolation between the transmitting UEs and the receiving UEs. For example, the coordinating UE 111 can use location information of the UEs in the UECS to select UEs for the two subsets that provide the greatest isolation or a minimum acceptable isolation between the joint-transmission UEs (the DL-coordinating subset 404) and the joint-reception UEs (the UL-coordinating subset 406). For example, the coordinating UE 111 selects UEs for the two subsets to provide an amount of isolation (e.g., at least 50 dB of isolation) that allows the joint-processing to cancel crosstalk from joint-transmissions to joint-receptions.

The coordinating UE 111 (or another UE, for example a target UE) can cancel crosstalk from joint-transmissions to joint-receptions during joint-processing of the received downlink signals. For example, in the UECS 402, the joint-transmissions by the UEs 114 and 115 may cause interference to the joint-receptions by the UEs 111, 112, and 113. Based on joint-processing of uplink signals for joint-transmission, the coordinating UE 111 can cancel crosstalk from joint-transmissions to joint-receptions using knowledge of the uplink signals for joint-transmission and the timing of the joint-transmission.

Alternatively or additionally, the role of the coordinating UE for full-duplex communication can be shared by two UEs by assigning a first UE the role of coordinating joint-reception (RX-coordinating UE) and assigning a second UE the role of coordinating joint-transmission (TX-coordinating UE). When the role of the coordinating UE is shared, the TX-coordinating UE may share information related to the joint-transmissions with the RX-coordinating UE to assist the RX-coordinating UE in canceling crosstalk from the joint-transmission on the jointly-received signals.

Any single UE in the UL-coordinating subset 406 or in the DL-coordinating subset 404 may not overlap their transmissions and receptions in a single time interval (e.g., in a single slot or symbol), but the UEs composing the UL-coordinating subset 406 and the DL-coordinating subset 404 can change dynamically. For example, a target DL UE (e.g., the UE 112) in the DL-coordinating subset 404 switches to a TX-coordinating UE role for the UL-coordinating subset 406. Meanwhile, the DL-coordinating subset 404 continues to perform DL reception for the target DL UE 112.

Figure 5:
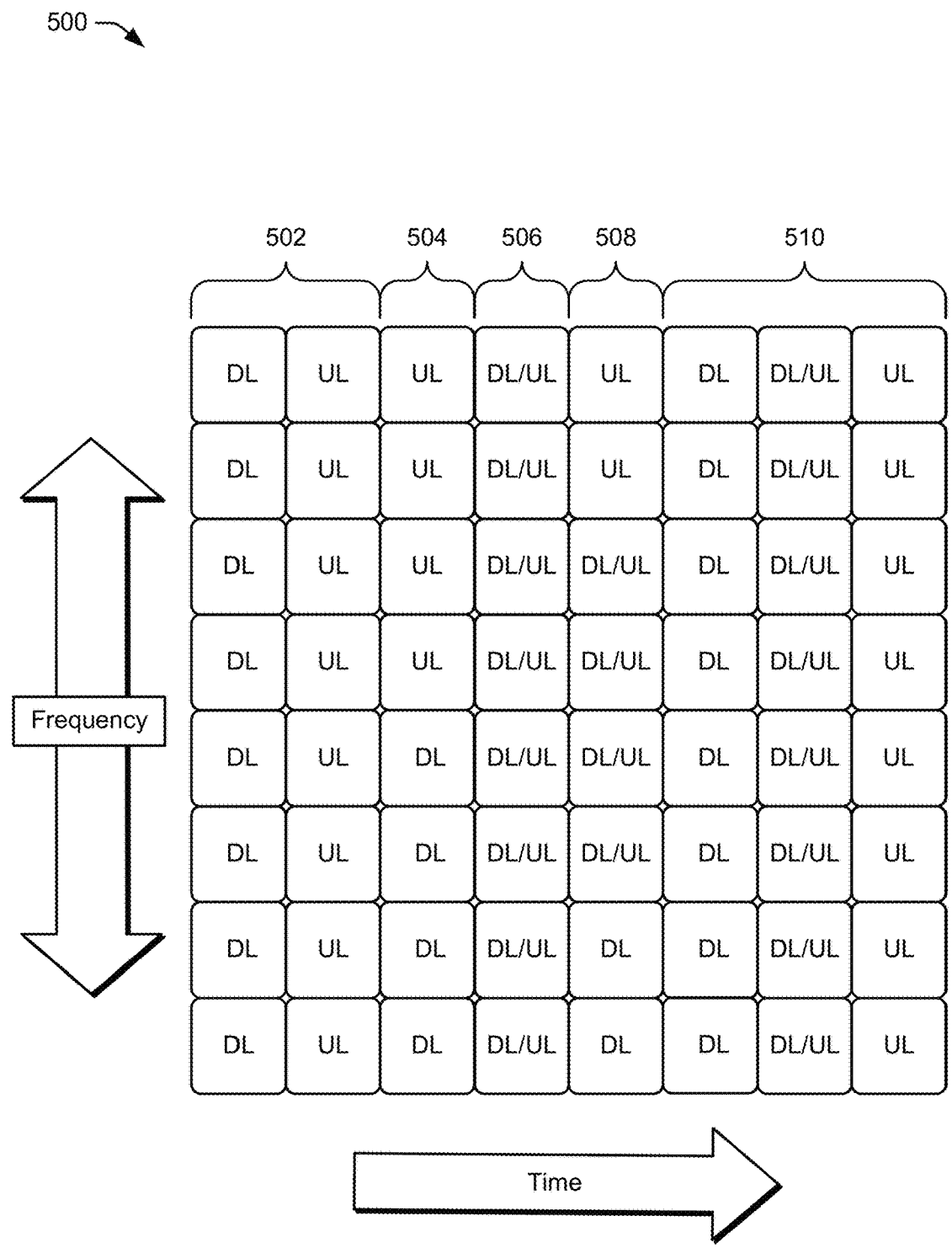
FIG. 5 illustrates various allocations of an air interface resource that extends between a UECS and a base station and with which various aspects of user equipment-coordination set full-duplex communication can be implemented.

In other aspects, the base station 121 can allocate the downlink and uplink frequency resources based on the UECS 402 being capable of full-duplex communication. FIG. 5 illustrates various allocations of an air interface resource that extends between a UECS and a base station and with which various aspects of user equipment-coordination set full-duplex communication can be implemented. When the UECS 402 is not operating using full-duplex communication, the base station 121 can allocate resources for Time Division Duplex (TDD) communication as illustrated in the columns of resource elements at 502 for downlink (DL) and uplink (UL) communication or the base station 121 can allocate resources for Frequency Division Duplex (FDD) communication as illustrated in the column of resource elements at 504. The coordinating UE 111 indicates the full-duplex capability of the UECS 402 to the base station 121, for example, when the coordinating UE 111 can determine subsets of joint-transmission and joint-reception UEs that have sufficient isolation to support joint-processing of full-duplex communication with the base station 121. For example, the coordinating UE 111 indicates the full-duplex capability of the UECS 402 in a capability information element that includes fields for a UECS Radio Network Temporary Identifier (UECS-RNTI) and an associated full-duplex bandwidth that the coordinating UE 111 determines that the UECS 402 can support. For example, the coordinating UE 111 estimates the isolation between the joint-transmission UEs and the joint-reception UEs (e.g., based on the locations of the UEs in the UECS) to determine a bandwidth for which the joint-processing in the UECS can cancel crosstalk. For example, if the coordinating UE 111 estimates a relatively-lower isolation, the coordinating UE 111 indicates a narrower full-duplex bandwidth (e.g., a 10 MHz bandwidth) or if the coordinating UE 111 estimates a relatively-higher isolation, the coordinating UE 111 indicates a wider full-duplex bandwidth (e.g., a 100 MHz bandwidth).

Based on indicated full-duplex bandwidth, the base station 121 allocates uplink and downlink resources at the same time slot and on the same frequency to the joint-transmission UEs and the joint-reception UEs in the UECS 402 and transmits a resource grant to the coordinating UE that indicates the allocated resources. For example, the base station 121 allocates all the resource elements in column 506 for full-duplex (DL and UL) communication between the base station 121 and the UECS 402. The resources for the uplink and the downlink can be the same or different within the same frequency range, such as shown in column 508. If the indicated full-duplex bandwidth indicates that the UECS 402 cannot perform crosstalk cancellation and thus full-duplex communication, the base station 121 will not grant resources for concurrent uplink and downlink communication on the same time slot for the UEs in the UECS 402.

The base station 121 can schedule a DL grant and a UL grant for the same target UE in the UECS 402 or different target UEs in the UECS 402. The resource grant, different from the resource grant(s) to the UECS for the target UE when the UEs in the UECS jointly receive or jointly transmit using non-full-duplex communication on behalf of the target UE, can be granted by base station 121 or by the coordinating UE 111 master UE using the local wireless network in the UECS 402. For example, if the base station 121 scheduled DL and UL communications concurrently on the same time slot for the UE 112, the coordinating UE 111 can still determine that the UEs 111, 112, and 113 will perform the joint-reception for the downlink data for UE 112, while the UEs 114 and 115 perform the joint-transmission of the UL data of UE 112, with the coordinating UE 111 coordinating crosstalk cancellation of the uplink signal to the downlink reception for the UE 112.

In a further aspect, the ability of the UECS to perform full-duplex communication can vary over time, for example, based on changes in isolation due to movement of the UEs in the UECS, departure of a UE from the UECS, or addition of a UE to the UECS. The coordinating UE 111 and/or the base station 121 can determine changes in the ability of the joint-processing to cancel crosstalk during full-duplex communication based on any suitable indication or measurement of the full-duplex communication. In a first example, the coordinating UE 111 and/or the base station 121 can monitor a ratio of negative acknowledgements (NACKs) to acknowledgments (ACKs) for downlink communications where an increasing ratio of NACKs to ACKs indicates that the crosstalk canceling by the joint-processing is decreasing in effectiveness. The coordinating UE 111 may evaluate the ratio of NACKs to ACKs against a threshold value and, based on the ratio of NACKs to ACKs exceeding the threshold value, the coordinating UE 111 determines an updated value for the full-duplex bandwidth and transmits an indication of that updated full-duplex bandwidth to the base station 121 to indicate that the UECS 402 can only support a narrower bandwidth for full-duplex communication or that the UECS 402 can no longer support full-duplex communication. Alternatively or additionally, the base station 121 may evaluate the ratio of NACKs to ACKs that it receives for downlink data against a threshold value and based on determining that the ratio of NACKs to ACKs exceeds the threshold, the base station changes the allocation of resources for full-duplex communication to reduce the channel bandwidth for full-duplex communication with the UECS 402, reduces the overlap of DL and UL resources for full-duplex communication, or reallocates resources to terminate full-duplex communication with the UECS 402.

In a second example, the base station 121 can allocate a partial overlap of resource elements for full-duplex communication with the UECS 402 to evaluate the crosstalk-cancellation capability of the joint-processing in the UECS 402. The base station 121 allocates a first portion of the resource elements for full-duplex communication to overlap in time and frequency and a second portion to not overlap in time and/or frequency. For example, the base station 121 allocates the resource elements in a time slot (column 508) based on frequency such that fifty percent of the resource elements are allocated for full-duplex communication (DL/UL) and the remaining resource elements are allocated for DL or UL communication with the UECS 402. In another example, the base station 121 allocates the resource elements based on time slots (illustrated in the columns 510), such that one-third of the resource elements are allocated for full-duplex communication (DL/UL), another one-third of the resource elements are allocated for DL communication, and the remaining third are allocated for UL communications with the UECS 402. The base station 121 can allocate resource elements in any suitable manner based on time and/or frequency to allocate varying proportions of resources to downlink, uplink, and/or full-duplex communication with the UECS 402. The coordinating UE 111 determines a signal quality metric (e.g., a signal to noise ratio (SNR) or a signal to noise and interference ratio (SINR)) for the first portion of the resource blocks (the overlapped resource blocks) and the second portion of the resource blocks (the non-overlapped resource blocks) to determine the efficacy of joint-processing to cancel UL to DL crosstalk. Based on the determination, the coordinating UE 111 can determine an updated value for the full-duplex bandwidth and transmit an indication of that updated full-duplex bandwidth to the base station 121 to indicate that the UECS 402 can only support a narrower bandwidth for full-duplex communication or that the UECS 402 can no longer support full-duplex communication.

Figure 6:
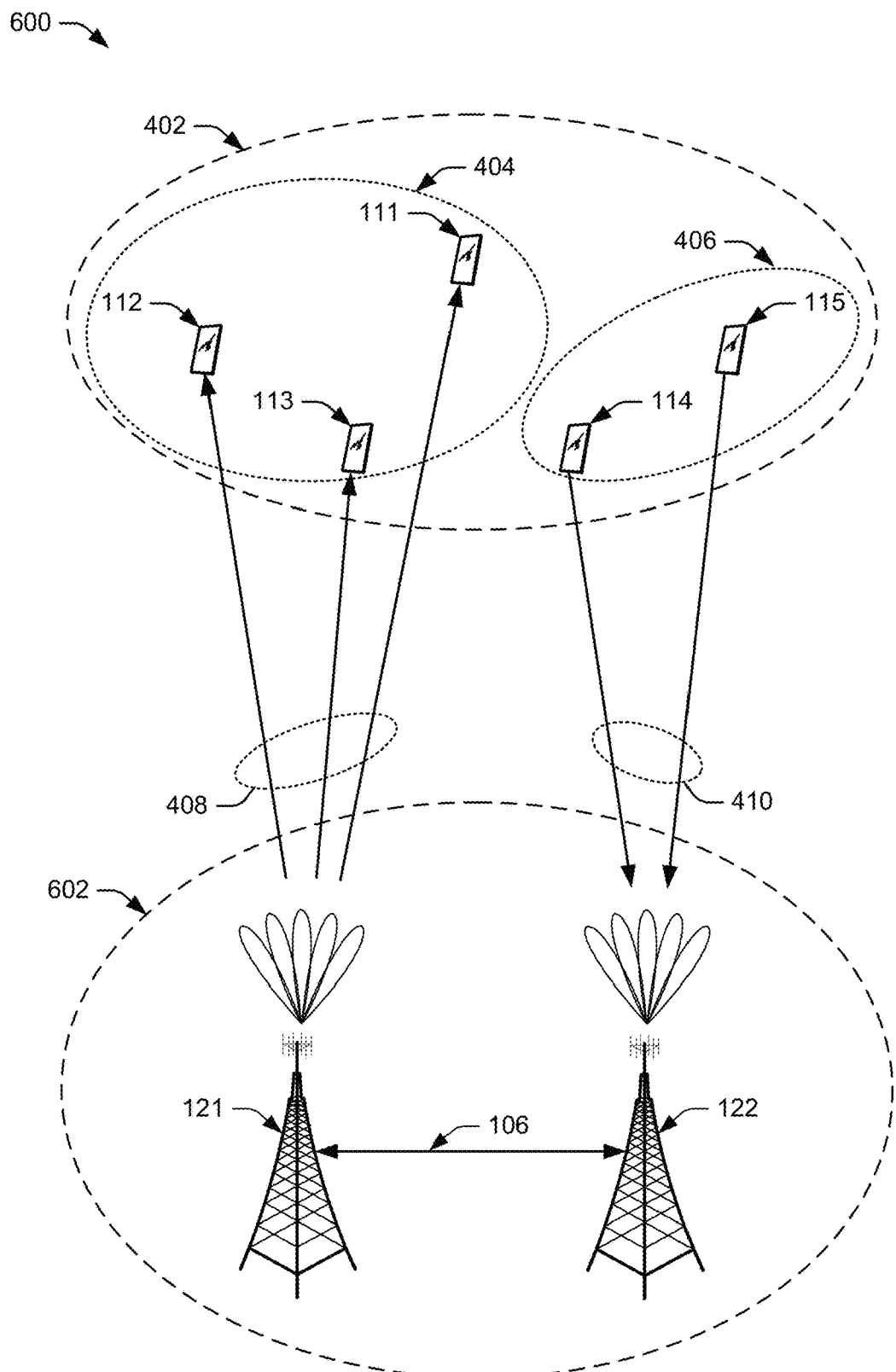
FIG. 6 illustrates an example environment in which various aspects of user equipment-coordination set full-duplex communication can be implemented.

User Equipment-Coordination Set Full-Duplex Communication with an Active Coordination Set FIG. 6 illustrates an example implementation 600 of user equipment-coordination set full-duplex communication. The illustrated example includes an active coordination set (ACS) 602 that includes the base station 121 and the base station 122, and the UECS 402 that includes the UE 111, UE 112, UE 113, UE 114, and UE 115. Although, for the sake of illustration clarity, the UECS in FIG. 6 is illustrated as including five UEs, any number of UEs greater than one may be included in a UECS. In the UECS 402, the UE 111 is acting as the coordinating UE for the UECS 402. Although not illustrated for the sake of clarity, the UEs in the UECS communicate with each other using local wireless network connections as discussed above. Although, for the sake of illustration clarity, the ACS in FIG. 6 is illustrated as including two base stations, any number of base stations greater than one may be included in an ACS.

In the ACS 602, the base station 121 is acting as a coordinating (master) base station for the joint transmission and/or joint reception between the ACS 602 and the UECS 402. From the perspective of the UECS 402 and the UEs included in the UECS 402, the operations of full-duplex communication are the same when communicating with the ACS 602 as those described for communicating with the base station 121 as described above with respect to FIG. 4. Which one of the base stations in the ACS 602 is the coordinating base station is transparent to the UECS 402, and the coordinating base station can change as base stations are added and/or removed from the ACS. The coordinating base station coordinates control-plane and user-plane communications for the joint communication with the USCS 402 via the Xn interface 106 (or a similar 4G, 5G, or 6G interface) to the base station 122 and maintains the user-plane context between the target UE in the UECS 402 and the core network 150. The coordinating base station 121 may use proprietary or standards-based messaging, procedures, and/or protocols for coordination of operations of the ACS 602. The coordinating base station schedules air interface resources for the joint communication for the UECS 402 and the base stations 121 and 122, based on the ACS associated with the target UE.

In aspects of full-duplex communication, as compared to full-duplex communication with a single base station, an ACS can provide higher isolation (e.g., 60 to 70 dB) between downlink transmissions and uplink receptions by using a first base station 121 in the ACS 602 for downlink transmissions to the UECS 402 and using the second base station 122 in the ACS 602, that is physically separated from the base station 121, for downlink transmissions. As illustrated in FIG. 6, the base station 121 transmits downlink signals 408 to the DL-coordinating subset 404 of UEs (the UEs 111, 112, and 113) in the UECS 402 and the base station 122 receives uplink signals from the UL-coordinating subset 406 of UEs (the UEs 114 and 115). Although in FIG. 6, the base station 121 is illustrated as transmitting downlink signals to the DL-coordinating subset 404 of UEs and the base station 122 is illustrated as receiving uplink signals from the UL-coordinating subset 406 of UEs, either base station can transmit the downlink signals with the other base station receiving the uplink signals. Although base station 121 is described as acting in the role of the coordinating base station for the ACS 602, which base station in the ACS is the coordinating base station is independent from whether the base station is transmitting the downlink signals or receiving the uplink signals for the ACS 602. The coordinating base station 121 can provide the downlink data and associated transmission timings and resource allocations to the base station 122 using the Xn interface 106 to enable the base station 122 to use that information to cancel crosstalk to the uplink signals from the concurrently transmitted downlink signals.

In further aspects, the base station 122 receives indications of the full-duplex capability of the UECS 402 from the UECS 402. The base station 122 forwards the full-duplex capability of the UECS 402 to the coordinating base station 121 that manages resource allocation for the full-duplex communication as described above with respect to FIG. 4.

Figure 7:
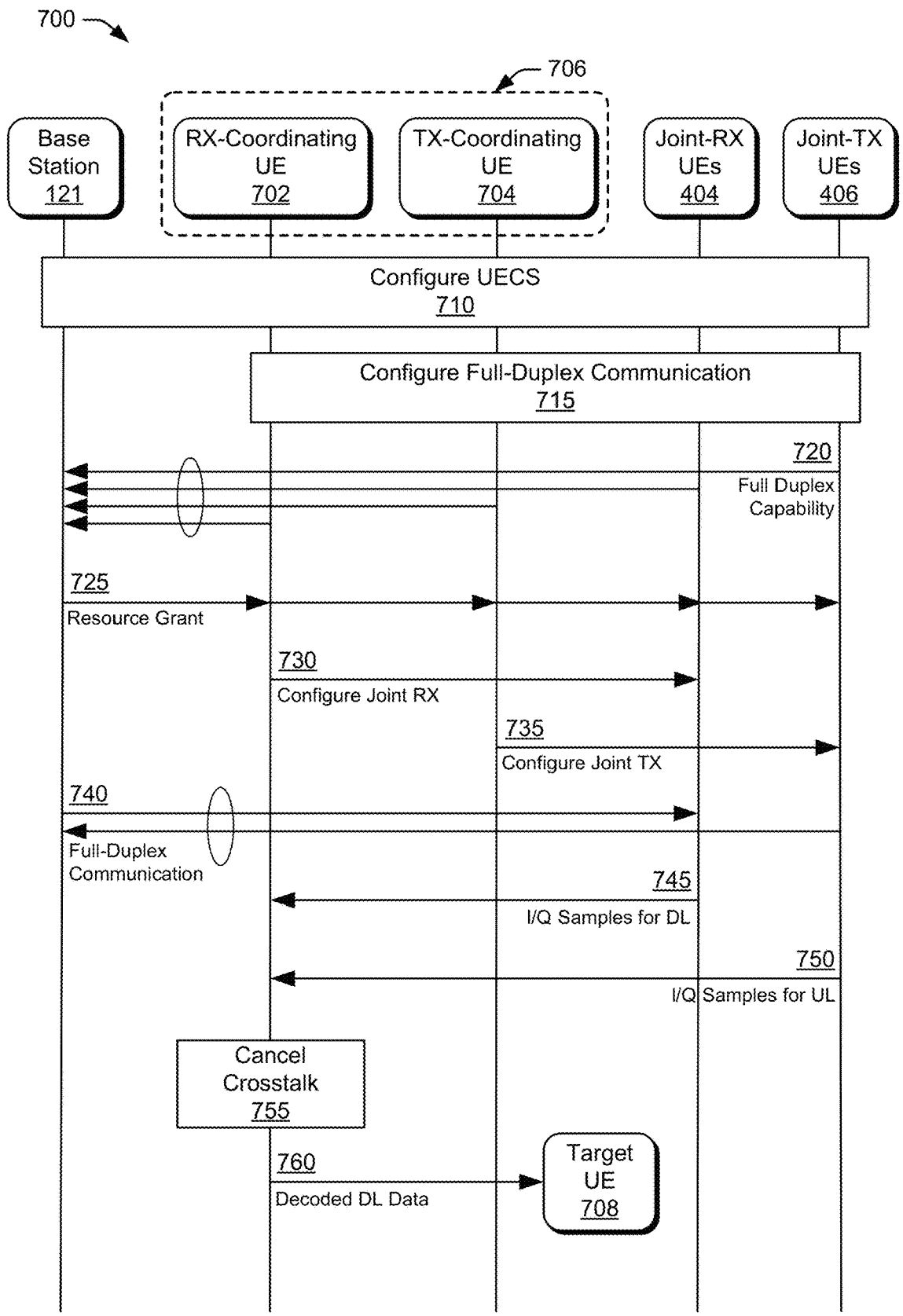
FIG. 7 illustrates data and control transactions between devices of a user-equipment-coordination set and a base station in accordance with aspects of user equipment-coordination set full-duplex communication.

FIG. 7 illustrates data and control transactions between devices of a user-equipment-coordination set and a base station in accordance with aspects of user equipment-coordination set full-duplex communication. The UECS includes the DL-coordinating subset 404 (joint-RX UEs 404), the UL-coordinating subset 406 (joint-TX UEs 406), an RX-coordinating UE 702, and a TX-coordinating UE 704. The roles of the RX-coordinating UE 702 and the TX-coordinating UE 704 can alternatively be performed by a single UE (e.g., the coordinating UE 111) as illustrated at 706. The UECS jointly-communicates on behalf of a target UE 708. Additionally or optionally, the target UE 708 may be included in the DL-coordinating subset 404, may be included in the UL-coordinating subset 406, may be the RX-coordinating UE 702, may be the TX-coordinating UE 704, or may be the coordinating UE 111.

At 710, the base station 121 configures a UECS (e.g., the UECS 402) including the joint-RX UEs 404, the joint-TX UEs 406, the RX-coordinating UE 702, and the TX-coordinating UE 704. At 715, the coordinating UE 111 configures full-duplex communication for the UECS, including selecting the DL-coordinating subset 404 (joint-RX UEs 404) and the UL-coordinating subset 406 (joint-TX UEs 406). The coordinating UE 111 also determines if it will assume the roles of the RX-coordinating UE 702 and the TX-coordinating UE 704 or if those roles will be split between two different UEs in the UECS.

At 720, the coordinating UE 111 transmits an indication that the UECS is capable of full-duplex communication to the base station 121. The indication can be jointly-transmitted by all or a subset of the UEs in the UECS.

At 725, the base station 121 transmits a resource grant for the target UE 708 in the UECS. The resource grant indicates downlink resources and uplink resources for full-duplex communication for the target UE 708. The base station 121 can transmit the resource grant directly to the coordinating UE 111 or to the UECS that jointly-receives the resource grant. When the roles of the RX-coordinating UE 702 and the TX-coordinating UE 704 are performed by different UEs, the coordinating UE 111 forwards the resource grant information to the RX-coordinating UE 702 and the TX-coordinating UE 704 using the local wireless network (not illustrated).

At 730, the RX-coordinating UE 702 forwards a configuration for joint-reception to the joint-RX UEs 404 using the local wireless network. At 735, the TX-coordinating UE 704 forwards a configuration for joint-transmission to the joint-TX UEs 406 using the local wireless network. The configuration for joint-reception and/or joint-reception includes, timing advance information, beam configurations, or the like.

At 740, the UECS conducts full-duplex communication with the base station 121 using the granted resources. The UEs in the DL-coordinating subset 404 (joint-RX UEs 404) demodulate and sample the downlink signals from the full-duplex communication. At 745, the UEs in the DL-coordinating subset 404 forward the I/Q samples of the downlink communication to the RX-coordinating UE 702 using the local wireless network.

At 750, the TX-coordinating UE 704 sends I/Q samples of the uplink data from the full-duplex communication to the RX-coordinating UE 702 using the local wireless network or an internal wired connection for a single coordinating UE 111. In one alternative, the target UE 708 sends I/Q samples of the uplink data from the full-duplex communication to the RX-coordinating UE 702 using the local wireless network (not illustrated). In another alternative, if the coordinating UE 111 is performing the roles of the RX-coordinating UE 702 and the TX-coordinating UE 704, the target UE 708 sends I/Q samples of the uplink data from the full-duplex communication to the coordinating UE 111.

At 755, the RX-coordinating UE 702 (or the coordinating UE 111) jointly processes the combined I/Q samples of the downlink communication to provide decoded data. The RX-coordinating UE 702 (or the coordinating UE 111) uses the I/Q samples of the uplink data to cancel the undesired crosstalk of the uplink signals from the received downlink signals. At 760, the RX-coordinating UE 702 (or the coordinating UE 111) sends the decoded downlink data to the target UE 708.

Example Methods

Figure 8:
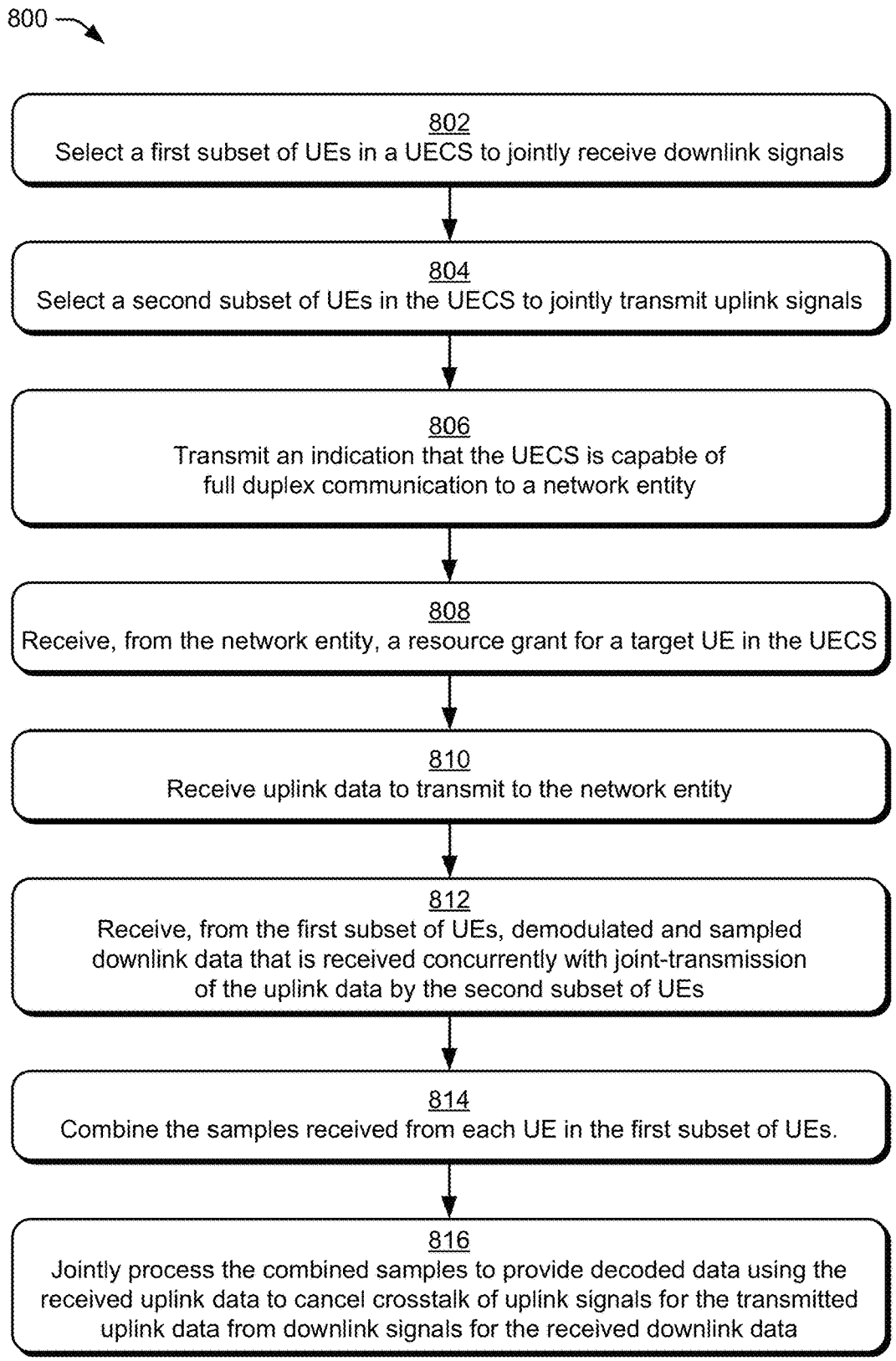
FIG. 8 illustrates an example method of user equipment-coordination set full-duplex communication as generally related to the coordinating user equipment of the user equipment-coordination set in accordance with aspects of the techniques described herein.

FIG. 8 illustrates example method(s) 800 of user equipment-coordination set full-duplex communication as generally related to the coordinating UE of the UECS. At 802, a coordinating user equipment (e.g., the UE 111) selects a first subset of UEs (e.g., the DL-coordinating subset 404) in a UECS (e.g., the UECS 402) to jointly receive downlink signals. At 804, the coordinating user equipment selects a second subset of UEs (e.g., the UL-coordinating subset 406) in the UECS to jointly transmit uplink signals. For example, the coordinating UE 111 evaluates location information associated with UEs in the UECS 402 to select the DL-coordinating subset 404 of UEs and the UL-coordinating subset 406 of UEs to maximize the isolation between the transmission of uplink signals and the reception of downlink signals to facilitate full-duplex communication between the UECS 402 and a base station or ACS.

At 806, the coordinating UE transmits (or the UECS jointly-transmits) an indication that the UECS is capable of full-duplex communication to a network entity (e.g., the base station 121 or the ACS 602). For example, the coordinating UE 111 transmits an indication that the UECS 402 is capable of full-duplex communication to the base station 121 or the ACS 602. The coordinating UE 111 can transmit the indication in a capability information element. The indication includes a further indication of a full-duplex bandwidth for the full-duplex communication.

At 808, the coordinating UE receives, from the network entity, a resource grant for a target UE in the UECS. For example, the coordinating UE 111 receives (or the UECS jointly-receives) a resource grant that indicates downlink resources and uplink resources for full-duplex communication for a target UE in the UECS 402.

At 810, the coordinating UE receives uplink data to transmit to the network entity. For example, the coordinating UE 111 receives uplink data to transmit to the network entity from the target UE or a TX-coordinating UE. The coordinating UE 111 receives the uplink data in the form of I/Q samples using a local wireless connection to the other UEs in the UECS 402.

At 812, the coordinating UE receives, from the first subset of UEs, demodulated and sampled downlink data that is received concurrently with joint-transmission of the uplink data by the second subset of UEs. For example, the coordinating UE 111 receives, from the DL-coordinating subset 404 of UEs, demodulated and sampled downlink data that is received by those UEs concurrently with joint-transmission of the uplink data by the UL-coordinating subset 406 of UEs.

At 814, the coordinating UE combines the samples received from each UE in the first subset of UEs. At 816, the coordinating UE jointly processes the combined samples to provide decoded data using the received uplink data to cancel crosstalk from uplink signals for the transmitted uplink data to downlink signals for the received downlink data. For example, the coordinating UE 111 combines the samples received from each UE in the DL-coordinating subset 404 of UEs and jointly processes the combined samples to provide decoded data using the received uplink data to cancel crosstalk from uplink signals for the transmitted uplink data to downlink signals for the received downlink data. For example, to cancel crosstalk the coordinating UE reconstructs the transmit interference based on the transmit IQ samples from the UEs that are performing joint-transmission. The coordinating UE then subtracts the reconstructed transmit interference from the received IQ samples of the joint-receiving UEs.

Figure 9:
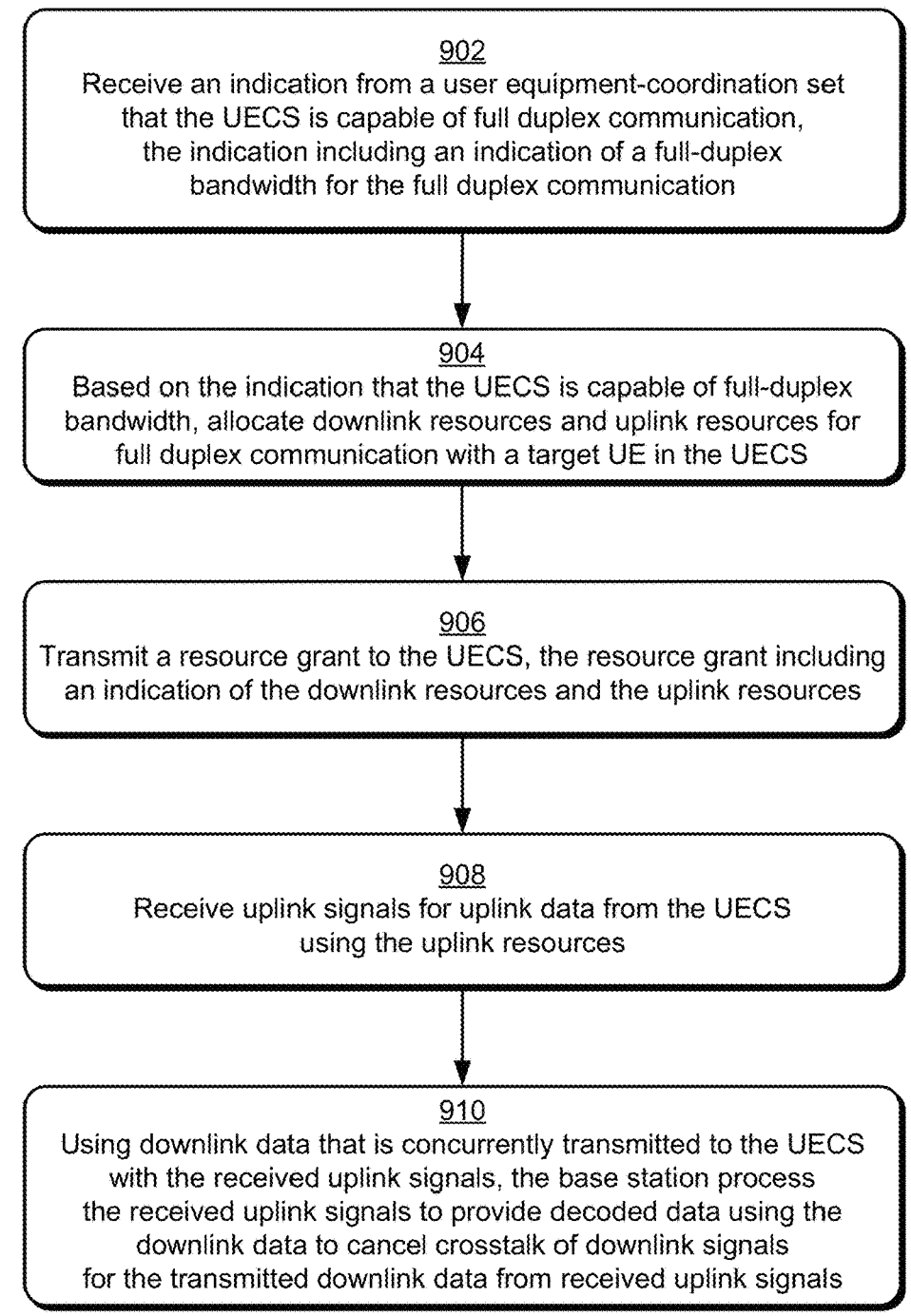
FIG. 9 illustrates an example method of user equipment-coordination set full-duplex communication as generally related to a base station communicating with a user equipment-coordination set in accordance with aspects of the techniques described herein.

FIG. 9 illustrates example method(s) 900 of user equipment-coordination set full-duplex communication as generally related to a base station communicating with a UECS. At 902, a base station (e.g., the base station 121) receives an indication from a user equipment-coordination set (e.g., the UECS 402) that the UECS is capable of full-duplex communication, the indication including an indication of a full-duplex bandwidth for the full-duplex communication. For example, the base station 121 receives an indication that the UECS 402 is capable of full-duplex communication. The indication includes a full-duplex bandwidth for the full-duplex communication, and the base station 121 receives the indication in a capability information element.

At 904, based on the indication that the UECS is capable of full-duplex bandwidth, the base station allocates downlink resources and uplink resources for full-duplex communication with a target UE in the UECS. For example, the base station 121 allocates downlink resources and uplink resources that overlap in time and in frequency for full-duplex communication with a target UE in the UECS 402.

At 906, the base station transmits a resource grant to the UECS, the resource grant including an indication of the downlink resources and the uplink resources. For example, the base station 121 transmits a resource grant to the UECS 402, the resource grant including an indication of the downlink resources and the uplink resources for full-duplex communication.

At 908, the base station receives uplink signals (e.g., the uplink signals 410) for uplink data from the UECS using the uplink resources. At 910, using downlink data that is concurrently transmitted to the UECS with the received uplink signals, the base station processes the received uplink signals to provide decoded data using the downlink data to cancel crosstalk from downlink signals (e.g., the downlink signals 408) for the transmitted downlink data to the received uplink signals. For example, the base station 121 during full-duplex communication uses downlink data that the base station 121 transmits concurrently with the receiving the uplink signals to cancel crosstalk from downlink signals for the transmitted downlink data to the received uplink signals.

Example methods 800 and 900 are described with reference to FIGS. 8 and 9 in accordance with one or more aspects of user equipment-coordination set full-duplex communication. The order in which the method blocks are described are not intended to be construed as a limitation, and any number of the described method blocks can be skipped, repeated, or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

In the following some examples are described:

Example 1: A method performed by a user equipment, UE, configured as a coordinating user equipment for a user equipment-coordination set, UECS, of UEs connected by a local wireless network in a wireless communications network, the method comprising the coordinating user equipment:

selecting a first subset of UEs in the UECS to jointly receive downlink signals;

selecting a second subset of UEs in the UECS to jointly transmit uplink signals;

transmitting an indication that the UECS is capable of full-duplex communication to a network entity;

receiving, from the network entity, a resource grant for a target UE in the UECS;

receiving uplink data to transmit to the network entity;

receiving, from the first subset of UEs, demodulated and sampled downlink data, the demodulated and sampled downlink data jointly received by the first subset of UEs concurrently with joint transmission of modulated and coded uplink data by the second subset of UEs;

combining the samples received from each UE in the first subset of UEs; and jointly processing the combined samples to provide decoded data using the received modulated and coded uplink data to cancel crosstalk of uplink signals for the transmitted uplink data from downlink signals for the received downlink data.

Example 2: The method of example 1, wherein the transmitting the indication that the UECS is capable of full-duplex communication comprises:
transmitting a UECS Radio Network Temporary Identifier (UECS-RNTI) and/or an indication of an associated full-duplex bandwidth to the network entity.

Example 3: The method of example 1 or example 2, wherein the transmitting the indication that the UECS is capable of full-duplex communication comprises:
transmitting the indication that the UECS is capable of full-duplex communication in a capability information element.

Example 4: The method of any of the preceding examples, wherein the UEs included in the first subset of UEs does not overlap with the UEs included in the second subset of UEs.

Example 5: The method of any one of the preceding examples, wherein the selecting the first subset of UEs and selecting the second subset of UEs comprises:
selecting the UEs for the first subset of UEs and selecting the second subset of UEs based on location information associated with each respective UE in the UECS.

Example 6: The method of any one of the preceding examples, wherein the coordinating UE coordinates joint-reception of the downlink signals by the first subset of UEs, wherein the coordinating UE coordinates joint-transmission of the uplink signals by the second subset of UEs, and wherein the receiving the uplink data to transmit to the network entity comprises:
receiving the uplink data from the target UE over a local wireless connection.

Example 7: The method of any one of the preceding examples, wherein the coordinating UE coordinates joint-reception of the downlink signals by the first subset of UEs, wherein another coordinating UE coordinates joint-transmission of the uplink signals by the second subset of UEs, and wherein the receiving the uplink data to transmit to the network entity comprises:
receiving the uplink data from the other coordinating UE.

Example 8: The method of any one of the preceding examples, further comprising the coordinating user equipment:
monitoring an indication of performance of the full-duplex communication;
based on determining that the indication of the performance is below a threshold value of performance, determining an updated full-duplex bandwidth; and
transmitting the updated full-duplex bandwidth to the network entity.

Example 9: The method of example 8, wherein the indication of the performance of the full-duplex communication comprises a ratio of negative acknowledgements, NACKs, to acknowledgments, ACKs, for downlink communications.

Example 10: The method of example 8, wherein the monitoring the indication of performance of the full-duplex communication comprises:
measuring a link quality parameter for downlink communications.

Example 11: The method of example 10, wherein the link quality parameter includes:
a signal to noise ratio; or
signal to noise and interference ratio.

Example 12: The method of any one of the preceding examples, wherein the first subset of UEs incudes the coordinating UE, the method further comprising the coordinating UE:
receiving downlink signals for the downlink data;
demodulating and sampling the downlink signals to produce a set of samples of the downlink signals; and
wherein combining the samples received from each UE in the first subset of UEs includes combining the samples with the produced set of samples.

Example 13: The method of any one of the preceding examples, wherein the network entity is a base station.

Example 14: The method of any one of examples 1 to 12, wherein the network entity is an Active Coordination Set, ACS, that includes multiple base stations configured for Coordinated Multipoint Communication, wherein the first subset of UEs in the UECS jointly receives downlink signals from a first subset of base stations in the ACS, and wherein the second subset of UEs in the UECS jointly transmits uplink signals to a second subset of base stations in the ACS.

Example 15: The method of any one of the preceding examples, wherein the resource grant includes an indication of downlink resources and uplink resources in the same frequency bandwidth and at overlapping times.

Example 16: A user equipment comprising:
a radio frequency transceiver;
a processor; and
memory comprising instructions for a communication manager application that is executable to configure the user equipment to perform any one of the methods of the preceding examples.

Example 17: A method performed by a base station in a wireless communications network, the method comprising the base station:
receiving an indication from a user equipment-coordination set, UECS, that the UECS is capable of full-duplex communication;
based on the indication that the UECS is capable of full-duplex bandwidth, allocating downlink resources and uplink resources for full-duplex communication with a target user equipment, UE, in the UECS;
transmitting a first resource grant to the UECS, the first resource grant including an indication of the downlink resources and the uplink resources;
receiving uplink signals for uplink data from the UECS using the uplink resources; and
using downlink data that is concurrently transmitted to the UECS with the received uplink signals, processing the received uplink signals to provide decoded data using the downlink data to cancel crosstalk of downlink signals for the transmitted downlink data from received uplink signals.

Example 18: The method of example 17, the method further comprising the base station:
receiving an indication of an updated full-duplex bandwidth for the full-duplex communication;
based on the indication of the updated full-duplex bandwidth, modifying the allocation of the downlink resources and the uplink resources for the full-duplex communication; and
transmitting a second resource grant to the UECS, the second resource grant including an indication of the modified allocation of the downlink resources and the uplink resources.

Example 19: The method of example 17, the method further comprising the base station:

receiving an indication of performance of full-duplex communication from the UECS;

based on the received indication, modifying the allocation of the downlink resources and the uplink resources for the full-duplex communication such that a portion of the downlink resources and the uplink resources overlap; and transmitting a second resource grant to the UECS, the second resource grant including an indication of the modified allocation of the downlink resources and the uplink resources.

Example 20: The method of any one of examples 17 to 19, the method further comprising the base station:

transmitting the downlink data to the UECS concurrently with the receiving uplink signals for uplink data from the UECS.

Example 21: The method of any one of examples 17 to 20, wherein the base station is included in an Active Coordination Set, ACS, the method further comprising the base station:

receiving, from another base station in the ACS, the downlink data that is concurrently transmitted to the UECS.

Example 22: The method of any one of examples 17 to 21, wherein the indication that the UECS is capable of full-duplex communication includes an indication of a full-duplex bandwidth for the full-duplex communication.

Example 23: A base station comprising:
a wireless transceiver;
an inter-base station interface;
a processor; and
memory comprising instructions for a base station manager application that are executable by the processor to configure the base station to perform any of the methods of example 17 to example 22.

Example 24: A computer-readable medium comprising instructions that, when executed by a processor, cause an apparatus comprising the processor to perform any of the methods of examples 1 to 15 or 17 to 22.

Although aspects of user equipment-coordination set full-duplex communication have been described in language specific to features and/or methods, the subject of the appended claims is not necessarily limited to the specific features or methods described. Rather, the specific features and methods are disclosed as example implementations of user equipment-coordination set full-duplex communication, and other equivalent features and methods are intended to be within the scope of the appended claims. Further, various different aspects are described, and it is to be appreciated that each described aspect can be implemented independently or in connection with one or more other described aspects.

The invention claimed is:

1. A method performed by a user equipment (UE) configured as a coordinating user equipment for a user equipment-coordination set (UECS) of UEs connected by a local wireless network in a wireless communications network, the method comprising the coordinating user equipment:

selecting a first subset of UEs in the UECS to jointly receive downlink signals;

selecting a second subset of UEs in the UECS to jointly transmit uplink signals, the UEs included in the second subset of UEs not overlapping with the UEs included in the first subset of UEs;

transmitting an indication that the UECS is capable of full-duplex communication to a network entity;

receiving, from the network entity, a resource grant for a target UE for the UECS;

receiving uplink data to transmit to the network entity;

receiving, from the first subset of UEs, demodulated and sampled downlink data, the demodulated and sampled downlink data jointly received by the first subset of UEs concurrently with joint transmission of modulated and coded uplink data by the second subset of UEs;

combining the samples received from each UE in the first subset of UEs; and jointly processing the combined samples to provide decoded data using the received modulated and coded uplink data to cancel crosstalk of uplink signals for the transmitted uplink data from downlink signals for the received downlink data.

2. The method of claim 1, wherein the transmitting of the indication that the UECS is capable of full-duplex communication comprises:

transmitting a UECS Radio Network Temporary Identifier (UECS-RNTI) and/or an indication of an associated full-duplex bandwidth to the network entity.

3. The method of claim 1, wherein the transmitting of the indication that the UECS is capable of full-duplex communication comprises:

transmitting the indication that the UECS is capable of full-duplex communication in a capability information element.

4. The method of claim 1, wherein the selecting of the first subset of UEs and the selecting of the second subset of UEs comprises:

selecting the UEs for the first subset of UEs and selecting the second subset of UEs based on location information associated with each respective UE in the UECS.

5. The method of claim 1, wherein the coordinating UE coordinates joint-reception of the downlink signals by the first subset of UEs, wherein the coordinating UE coordinates joint-transmission of the uplink signals by the second subset of UEs, and wherein the receiving of the uplink data to transmit to the network entity comprises:

receiving the uplink data from the target UE over a local wireless connection.

6. The method of claim 1, wherein the coordinating UE coordinates joint-reception of the downlink signals by the first subset of UEs, wherein another coordinating UE coordinates joint-transmission of the uplink signals by the second subset of UEs, and wherein the receiving of the uplink data to transmit to the network entity comprises:

receiving the uplink data from the other coordinating UE.

7. The method of claim 1, further comprising the coordinating user equipment:

monitoring an indication of performance of the full-duplex communication;

based on determining that the indication of the performance is below a threshold value of performance;

determining an updated full-duplex bandwidth, and transmitting the updated full-duplex bandwidth to the network entity; or transmitting an indication that the UECS can no longer support full-duplex communication.

8. The method of claim 7, wherein the indication of the performance of the full-duplex communication comprises a ratio of negative acknowledgements (NACKs) to acknowledgments (ACKs) for downlink communications.

9. The method of claim 7, wherein the monitoring of the indication of performance of the full-duplex communication comprises:

measuring a link quality parameter for downlink communications.

10. The method of claim 9, wherein the link quality parameter includes:
    a signal to noise ratio; or
    signal to noise and interference ratio.

11. The method of claim 1, wherein the first subset of UEs includes the coordinating UE, the method further comprising the coordinating UE:
    receiving downlink signals for the downlink data;
    demodulating and sampling the downlink signals to produce a set of samples of the downlink signals; and
    wherein combining the samples received from each UE in the first subset of UEs includes combining the samples with the produced set of samples.

12. The method of claim 1, wherein the network entity is a base station.

13. The method of claim 1, wherein the network entity is an Active Coordination Set (ACS) that includes multiple base stations configured for Coordinated Multipoint Communication, wherein the first subset of UEs in the UECS jointly receives downlink signals from a first subset of base stations in the ACS, and wherein the second subset of UEs in the UECS jointly transmits uplink signals to a second subset of base stations in the ACS.

14. The method of claim 1, wherein the resource grant includes an indication of downlink resources and uplink resources in the same frequency bandwidth and at overlapping times.

15. A user equipment (UE) comprising:
    a radio frequency transceiver;
    a processor; and
    memory comprising instructions for a communication manager application that is executable to configure the user equipment to:
        select a first subset of UEs in a user equipment-coordination set (UECS) to jointly receive downlink signals;
        select a second subset of UEs in the UECS to jointly transmit uplink signals, the UEs included in the second subset of UEs not overlapping with the UEs included in the first subset of UEs;
        transmit an indication that the UECS is capable of full-duplex communication to a network entity;
        receive, from the network entity, a resource grant for a target UE in the UECS;
        receive uplink data to transmit to the network entity;
        receive, from the first subset of UEs, demodulated and sampled downlink data, the demodulated and sampled downlink data jointly received by the first subset of UEs concurrently with joint transmission of modulated and coded uplink data by the second subset of UEs;
        combine the samples received from each UE in the first subset of UEs; and
        jointly process the combined samples to provide decoded data using the received modulated and coded uplink data to cancel crosstalk of uplink signals for the transmitted uplink data from downlink signals for the received downlink data.

16. A method performed by a base station in a wireless communications network, the method comprising the base station:
    receiving an indication from a user equipment-coordination set (UECS) that the UECS is capable of full-duplex communication, the UECS comprising a first subset of UEs for jointly receiving downlink signals and a second subset of UEs for jointly transmitting uplink signals, the UEs included in the second subset of UEs not overlapping with the UEs included in the first subset of UEs;
    based on the indication that the UECS is capable of full-duplex bandwidth, allocating downlink resources and uplink resources for full-duplex communication with a target user equipment (UE) in the UECS;
    transmitting a first resource grant to the UECS, the first resource grant including an indication of the downlink resources and the uplink resources;
    receiving, from the second subset of UEs in the UECS, uplink signals for uplink data using the uplink resources; and
    using downlink data that is concurrently transmitted to the first subset of UEs in the UECS with the received uplink signals, processing the received uplink signals to provide decoded data using the downlink data to cancel crosstalk of downlink signals for the transmitted downlink data from received uplink signals.

17. The method of claim 16, the method further comprising the base station:
    receiving an indication of an updated full-duplex bandwidth for the full-duplex communication;
    based on the indication of the updated full-duplex bandwidth, modifying the allocation of the downlink resources and the uplink resources for the full-duplex communication; and
    transmitting a second resource grant to the UECS, the second resource grant including an indication of the modified allocation of the downlink resources and the uplink resources.

18. The method of claim 16, the method further comprising the base station:
    receiving an indication of performance of full-duplex communication from the UECS;
    based on the received indication, modifying the allocation of the downlink resources and the uplink resources for the full-duplex communication such that a portion of the downlink resources and the uplink resources overlap; and
    transmitting a second resource grant to the UECS, the second resource grant including an indication of the modified allocation of the downlink resources and the uplink resources.

19. The method of claim 16, the method further comprising the base station:
    transmitting the downlink data to the UECS concurrently within the same frequency bandwidth with the receiving uplink signals for uplink data from the UECS.

20. The method of claim 16, wherein the base station is included in an Active Coordination Set (ACS) the method further comprising the base station:
    receiving, from another base station in the ACS, the downlink data that is concurrently transmitted to the UECS.

21. The method of claim 16, wherein the indication that the UECS is capable of full-duplex communication includes an indication of a full-duplex bandwidth for the full-duplex communication.

22. A base station comprising:
    a wireless transceiver;
    an inter-base station interface;
    a processor; and
    memory comprising instructions for a base station manager application that are executable by the processor to configure the base station to:

receive an indication from a user equipment-coordination set (UECS) that the UECS is capable of full-duplex communication, the UECS comprising a first subset of UEs for jointly receiving downlink signals and a second subset of UEs for jointly transmitting uplink signals, the UEs included in the second subset of UEs not overlapping with the UEs included in the first subset of UEs;

based on the indication that the UECS is capable of full-duplex bandwidth, allocate downlink resources and uplink resources for full-duplex communication with a target user equipment (UE) in the UECS;

transmit a first resource grant to the UECS, the first resource grant including an indication of the downlink resources and the uplink resources;

receive, from the second subset of UEs in the UECS, uplink signals for uplink data using the uplink resources; and using downlink data that is concurrently transmitted to the first subset of UEs in the UECS with the received uplink signals, process the received uplink signals to provide decoded data using the downlink data to cancel crosstalk of downlink signals for the transmitted downlink data from received uplink signals.

* * * * *